R. W. BLATZ & H. B. HALLOCK.
VALVE.
APPLICATION FILED MAR. 23, 1916.

1,235,645.

Patented Aug. 7, 1917.

Witnesses:
Raymond Lloyd
Carl E. Karchenbach

Inventors.
Ray W. Blatz.
Howard B. Hallock.

UNITED STATES PATENT OFFICE.

RAY W. BLATZ AND HOWARD B. HALLOCK, OF WILKES-BARRE, PENNSYLVANIA.

VALVE.

1,235,645.   Specification of Letters Patent.   Patented Aug. 7, 1917.

Application filed March 23, 1916. Serial No. 86,266.

*To all whom it may concern:*

Be it known that we, RAY W. BLATZ and HOWARD B. HALLOCK, citizens of the United States, and residing at Wilkes-Barre, in the county of Luzerne, in the State of Pennsylvania, have invented a new and useful Valve, of which the following is a specification.

Our invention relates to improvement in valves in which air or liquid is designed to be automatically cut off by means of the pressure thereof, but, may be released by the operator at any time after the valve is attached to the object receiving the air or liquid.

The principal object of our invention is to provide a valve which may be manually controlled and prevent any leakage without the use of springs or packings of any sort.

We obtain these objects by the mechanism illustrated in accompanying drawing, in which.

Figure 1:
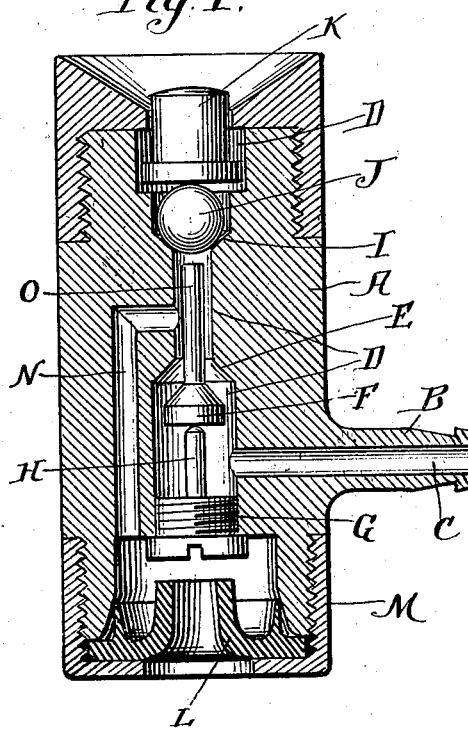
Figure 1 is a vertical section of valve showing the different parts in the position they would assume when the valve was disconnected from the supply.

In the drawings, A represents the body of valve; B is the stem for attaching the valve to a supply hose; C is an inlet opening through the stem to the chamber D, located within the interior of the body; E is a valve seat located within the chamber D; F is a valve adapted to be forced upon seat E by the pressure of air or liquid entering through inlet C. The chamber D extends through the valve body and is open at one end to exterior of same; the other end of chamber D is closed by a screw plug G which prevents the escape of air or liquid through this end of chamber. This screw plug G carries a stud H, upon which the valve F rests when the supply is cut off from the valve. This stud H extends inward beyond the point where the inlet C enters the chamber D, thus allowing the air or liquid to enter underneath the valve F and force it against the seat quickly.

I is a valve seat formed in the chamber D between the valve seat E and the open end of the chamber. This valve seat I is arranged exactly opposite to the seat E, and the valve J which operates in conjunction with the valve seat I, is adapted to be moved against the pressure of air or liquid to unseat valve F.

The valve J is shown in this case as a ball, but, it is obvious that a tapered valve, such as shown at F, could be utilized or a ball could be utilized in place of tapered valve F.

We, therefore, do not limit ourselves to shape and design of these valves.

K is a push button located in outer end of chamber D and extending beyond the exterior surface of the valve body. This button K comes in contact with valve J and is for the purpose of holding the valve J upon its seat by means of the finger. The button K is not absolutely essential as the valve J could extend to near the surface and could be held upon its seat by direct pressure of the finger upon the valve itself. Upon the end of the valve body opposite the push button K is located any suitable device for attaching to the object to receive the air or liquid. In this case we show a tire valve attachment which consists of the soft rubber washer L, through which the tire valve is forced and a cap M threaded upon the body and designed to hold the washer in place.

We do not wish to limit ourselves to any particular apparatus for attaching the valve to the receiver, as a screw or any other of well known attachments could be used; but, we show here the particular type of attachment which is in common use for inflating automobile tubes.

N is a passage formed in the valve body extending from the chamber D at a point between the valve seats E and I to the outlet of the valve.

O is a stem located within the chamber D between the valves F and J, and of such a length that said stem will prevent both valves being upon their seats at the same time. As for instance; if valve F is forced against its seat, the stem O will strike valve J and force it off its seat, or vice versa. This stem O may be a separate part simply floating in the chamber D, or may be formed by an extension on either one of the valves.

Figure 2:
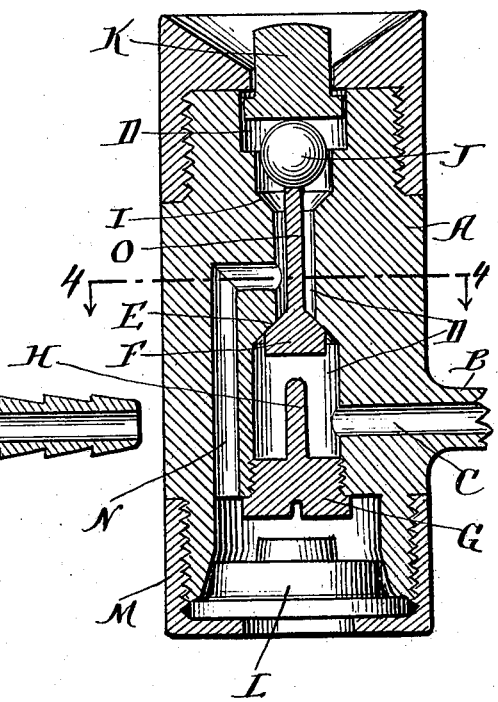
Fig. 2 is a similar view to Fig. 1, showing the parts in position they would assume when the valve is attached to supply.
Figure 3:
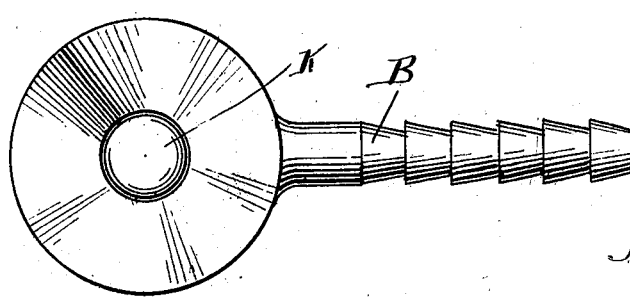
Fig. 3 is a plan view of the valve.
Figure 4:
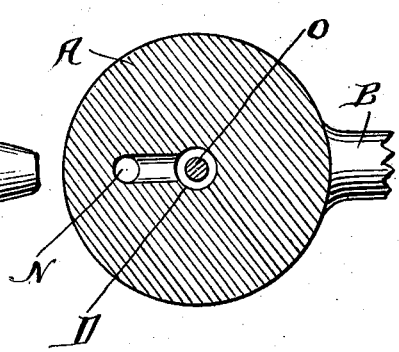
Fig. 4 is a cross section taken on line 4—4 Fig. 2.

The operation of valve is as follows:

When the air or liquid is forced through the inlet C, the valve F will be instantly forced against the seat E and the flow cut off from outlet passage, and at the same time the stem O will force the valve J off its seat and this valve J in turn will force the button K outward, and the parts will then be in the position shown in Fig. 2. By pressing inward upon the button K, after the valve is attached to the receiver, the valve J coming in contact with the stem O will force the valve F off its seat and will then allow a free flow to the outlet passage N. At the same time the pressure upon the button K will force the valve J upon its seat and thus prevent the escape of the air or liquid around the button K or through the open end of chamber D, and as soon as the pressure is released upon the button K, valve F is instantly forced upon its seat and the flow cut off.

While we have shown a stem B for attaching a hose, it is obvious that any well known form of attachment could be used to attach to tanks or other sources of supply. We, therefore, do not wish to be limited to construction herein shown; but

We claim:

In a valve, a body, a central opening extending longitudinally through said body, a removable plug closing one end of said opening, a chamber formed on the body beyond said plug, a tire valve attachment located at the outer end of said chamber, an inlet leading to the central opening, a valve located in the central opening adapted to be forced upon its seat by the incoming air, a second valve adapted to be manually forced upon its seat through the open end of said central opening, said valve located in the central opening between the first named valve and the open end of said opening, a separating member located between the valves, said member being of greater length than the distance between the valve seats and an outlet passage extending from the central opening at a point between the two valve seats to the chamber, as and for the purpose specified.

RAY W. BLATZ.
HOWARD B. HALLOCK.

Copies of this patent may be obtained for five cents each, by addressing the "Commissioner of Patents, Washington, D. C."